United States Patent
White et al.

(10) Patent No.: US 9,227,462 B2
(45) Date of Patent: Jan. 5, 2016

(54) OUTBOARD SEALING SYSTEM FOR A HEAVY-DUTY VEHICLE WHEEL END ASSEMBLY

(71) Applicant: Hendrickson USA, L.L.C., Itasca, IL (US)

(72) Inventors: Jay D. White, Massillon, OH (US); Dhawal Dharaiya, Twinsburg, OH (US)

(73) Assignee: Hendrickson USA, L.L.C., Itasca, IL (US)

( * ) Notice: Subject to any disclaimer, the term of this patent is extended or adjusted under 35 U.S.C. 154(b) by 160 days.

(21) Appl. No.: 14/132,105

(22) Filed: Dec. 18, 2013

(65) Prior Publication Data
US 2014/0175861 A1 Jun. 26, 2014

Related U.S. Application Data

(60) Provisional application No. 61/740,129, filed on Dec. 20, 2012.

(51) Int. Cl.
*B60C 23/00* (2006.01)
*B60B 7/00* (2006.01)

(52) U.S. Cl.
CPC ......... *B60B 7/0013* (2013.01); *B60Y 2200/142* (2013.01)

(58) Field of Classification Search
CPC ...... F16C 33/76; F16C 33/768; F16C 33/782; F16C 33/7813; F16C 33/783; F16C 33/7873; B60B 7/0013; B60B 7/0046; B60B 27/001; B60B 27/0073; B60B 27/065
USPC ............ 384/477–479, 489; 301/105.1, 108.1, 301/108.4, 111.03; 277/549, 551, 572, 573, 277/574
See application file for complete search history.

(56) References Cited

U.S. PATENT DOCUMENTS

| | | | |
|---|---|---|---|
| 7,056,028 B2 | 6/2006 | Hosoda et al. | |
| 7,594,664 B2 * | 9/2009 | Maskaliunas | 277/551 |
| 7,731,300 B2 | 6/2010 | Gerstenslager et al. | |
| 8,186,888 B2 * | 5/2012 | Ohtsuki | 384/544 |
| 2007/0081751 A1 | 4/2007 | Norimatsu et al. | |
| 2010/0247014 A1 | 9/2010 | Ohmori et al. | |
| 2011/0062772 A1 | 3/2011 | White | |
| 2012/0177315 A1 | 7/2012 | Matsuki et al. | |
| 2012/0228070 A1 | 9/2012 | Dharaiya | |

* cited by examiner

*Primary Examiner* — John Walters
*Assistant Examiner* — James Triggs
(74) *Attorney, Agent, or Firm* — Dureska, Kennedy & Moore, L.L.C.; David P. Dureska; Edward T. Kennedy (57) ABSTRACT

An outboard sealing system cooperates with components of a heavy-duty vehicle wheel end assembly to retain lubricant in the assembly. The sealing system includes a seal that is disposed axially between an outboard bearing and a hubcap of a wheel end assembly. The seal also extends radially between an axle spindle nut and a surface of a bore formed in the hub of the wheel end assembly. The seal forms a barrier between the outboard bearing and the hubcap to reduce a flow of lubricant from a hub cavity into the hubcap. The sealing system retains lubricant in the wheel end assembly, prevents contaminants from entering the wheel end assembly, and retains the relative position of the outboard bearing in the hub during servicing. The sealing system preferably includes an additional barrier that reduces corrosion at the interface of the hubcap and an outboard face of the hub.

21 Claims, 4 Drawing Sheets

OUTBOARD SEALING SYSTEM FOR A HEAVY-DUTY VEHICLE WHEEL END ASSEMBLY

CROSS-REFERENCE TO RELATED APPLICATIONS

This application claims the benefit of U.S. Provisional Patent Application Ser. No. 61/740,129, which was filed on Dec. 20, 2012.

BACKGROUND OF THE INVENTION

1. Technical Field

The invention relates to wheel end assemblies, and in particular to wheel end assemblies for heavy-duty vehicles, such as tractor-trailers. More particularly, the invention relates to an outboard sealing system for a heavy-duty vehicle wheel end assembly. Still more particularly, the invention is directed to a sealing system that includes a seal which cooperates with an axle spindle nut and a hub of the wheel end assembly. The seal is disposed between an outboard bearing and a hubcap of the wheel end assembly, and is formed with features that extend radially between the axle spindle nut and a bore of the hub of the wheel end assembly.

The sealing system retains lubricant in the wheel end assembly, and particularly at the interface between the axle spindle nut and the outboard bearing, and prevents contaminants from entering the wheel end assembly, thereby increasing the life of the wheel end assembly. The sealing system also retains the relative position of the outboard bearing in the hub during servicing of a brake rotor or components of the wheel end assembly, thereby minimizing potential problems encountered during the disassembly and/or reassembly of the wheel end assembly. Preferably, the sealing system also reduces corrosion at the interface of the hubcap and an outboard face of the hub, and provides an additional barrier that prevents corrosion from entering the wheel end assembly, further increasing the life of the wheel end assembly.

2. Background Art

For many years, the heavy-duty vehicle industry has utilized wheel end assemblies which typically are mounted on each end of one or more non-drive axles. Each wheel end assembly typically includes a hub rotatably mounted on a bearing assembly that in turn is immovably mounted on the outboard end of the axle, commonly known as an axle spindle. As is well known to those skilled in the art, for normal operation of the wheel end assembly to occur, the bearing assembly and surrounding components must be lubricated with a lubricant such as oil, grease, or semi-fluid grease. Therefore, the wheel end assembly must be sealed to prevent leakage of the lubricant, and also to prevent contaminants from entering the assembly, both of which could be detrimental to its performance. More specifically, a hubcap is mounted on an outboard end of the wheel hub, and a main seal or hub seal is rotatably mounted on an inboard end of the hub and the bearing assembly in abutment with the axle spindle, resulting in a closed or sealed wheel end assembly.

While most wheel end assemblies include these general features, the design and arrangement of the hub, bearing assembly, hubcap, main seal, and other components, as well as the axle spindle, vary according to the specific vehicle design and its anticipated uses. For example, hubcaps of the prior art often included a gasket disposed between a flange formed on the inboard end of the hubcap and the outboard surface of the hub. The gasket had been employed to provide a seal between the hubcap and the hub in order to prevent bearing lubricant from leaking out of the wheel end assembly, and to prevent contaminants from entering the assembly. Such hubcaps, while adequate for some applications, typically did not enable precise alignment of the hubcap with the axle spindle, and did not always provide effective seals.

In order to provide precise alignment of the hubcap with the axle spindle and to provide a more effective seal to prevent the bearing lubricant from leaking out of the outboard end of the wheel end assembly, and to prevent water and contaminants from entering the wheel end assembly, an improved prior art hubcap was developed. The improved prior art hubcap is more fully described in U.S. Pat. No. 7,731,300, which is owned by the same assignee as the present invention, Hendrickson USA, L.L.C. The improved prior art hubcap includes a radially-extending flange or shoulder that abuts an outboard face of the hub, and a lip that extends inboardly into a bore of the hub. An O-ring is mounted on the hubcap lip, so that the O-ring is disposed between the hubcap and the hub bore. The O-ring creates a seal between the hub and the hubcap, which provides an outboard seal for the wheel end assembly that retains lubricant in the wheel end assembly and prevents contaminants from entering the wheel end assembly. While such a hubcap works satisfactorily for its intended function, it is desirable to provide an even more effective seal to contain lubricant in the wheel end assembly, and to perform certain additional functions, as will be described in greater detail below.

More particularly, during vehicle operation, the forces that act on the wheel end assembly create a pumping action in the assembly. When semi-fluid grease is employed as the lubricant, this pumping action combines with the shape of the bearings to cause the semi-fluid grease to flow in an outboard direction away from the bearings and the hub, and into the hubcap. Such flow away from the bearings and the hub and into the hubcap creates a greater potential for leakage of lubricant at the hubcap seal to occur. In addition, the viscosity and the tackiness of the semi-fluid grease tends to cause the lubricant to remain in the hubcap when the vehicle is not operating, rather than flowing back to the bearings and the hub. The amount of lubricant that is retained at the bearings is therefore undesirably reduced, which may undesirably impair the operation of the bearings and reduce bearing life.

Moreover, because the hubcap is occasionally removed from the hub by a technician during servicing of the wheel end assembly, semi-fluid grease that remains in the hubcap creates an inconvenience for the technician, as he or she must clean the lubricant out of the hubcap. As a result, it is desirable to provide a sealing system that reduces the flow of lubricant such as semi-fluid grease outboardly away from the bearings and the hub, which reduces or minimizes potential leakage of lubricant, retains the lubricant at the bearings to maintain optimal bearing operation and life, and enables easier servicing of the wheel end assembly.

It is also desirable to provide a structure that properly retains the relative position of the outboard bearing on the hub during disassembly and/or reassembly of the wheel end assembly. Specifically, as mentioned above, the wheel end assembly is closed or sealed to prevent leakage of lubricant, and to reduce the possibility that contaminants may be introduced into the assembly. Over the life of the vehicle, it is necessary to service a brake rotor or other components that may be attached to the wheel end assembly, or components of the wheel end assembly itself. During the servicing of such components, the hub of the wheel end assembly must be removed from the axle spindle in a shop environment. In this disassembly operation, the spindle nut assembly is removed from the axle spindle, and a technician then typically pulls the hub, together with the bearings and main seal, as a unit, off of the axle spindle. During the disassembly process, the engagement of the main seal on the inboard end of the hub typically retains the general position of the inboard bearing. However, in the prior art, once the spindle nut assembly is removed, the outboard bearing lacks positive mechanical engagement With the outboard end of the hub, and may slide out of the outboard end of the hub during the disassembly process.

If the outboard bearing slides out of the hub, it may become damaged, and/or the remainder of the wheel end assembly may be exposed to contaminants, either one of which undesirably can reduce the life of the bearings. In addition, if the outboard bearing slides out of the hub during the disassembly process, or alternatively during reassembly of the wheel end assembly, the outboard end of the hub may undesirably shift or tip radially relative to the axle spindle, which may crimp or kink the main seal on the inboard end of the hub, thereby undesirably causing possible damage to the main seal.

Moreover, during reassembly of the wheel end assembly, it is desirable for the outboard bearing to be retained in a proper position before the spindle nut assembly is installed onto the axle spindle. More particularly, when the outboard bearing is retained in a proper position, the technician is able to focus on installation of the spindle nut assembly onto the axle spindle, rather than on the position of the outboard bearing. Such focus on the installation of the spindle nut assembly is important, as the installation of the spindle nut assembly typically is a precise operation that creates a clamp force on the bearings. If the position of the spindle nut assembly does not create a sufficient clamp force on the bearings and any spacer, there may be excessive end play of the bearings, which in turn creates excessive axial end play of the wheel end assembly relative to the axle spindle, thereby allowing undesirable movement of the main seal that may reduce the life of the main seal and the bearings. If the position of the spindle nut assembly creates a clamp force on the bearings and any spacer that is too high, the bearings may be effectively over-compressed, interfering with their rotation and causing them to possibly wear out prematurely. As a result, optimum positioning of the spindle nut assembly to create an optimum clamp force on the bearings and any spacer is important.

Therefore, movement of the outboard bearing out of the hub during disassembly or reassembly of the wheel end assembly may result in contamination of the wheel end assembly, damage to components, and/or potential improper installation of the spindle nut assembly, all of which result in an undesirable increase in the time and cost associated with the servicing of the wheel end assembly.

In the prior art, retainers have been employed to prevent movement of the outboard bearing out of the hub during disassembly or reassembly of the wheel end assembly. However, these retainers typically have been an integral part of a certain type of spindle nut assembly, which is not readily separable from the hub. More particularly, when a brake rotor or components of the wheel end assembly are to be serviced, certain prior art spindle nut assemblies are designed to be loosened on the axle spindle, and then removed from the axle spindle together with the hub. Some of these spindle nut assemblies include retainers, which possess disadvantages associated with reassembly of the wheel end assembly. For example, these retainers allow the outboard bearing to move somewhat, which creates the possibility that the outboard bearing may be out of position and/or not properly seated when the spindle nut assembly is tightened, thereby binding and thus damaging the bearing.

An improved bearing retainer was developed to retain the relative position of the outboard bearing out of the hub during disassembly or reassembly of the wheel end assembly. The improved bearing retainer includes a structure that improves the accuracy and efficiency of the servicing operation, and is more fully described in U.S. patent application Ser. No. 12/880,757, which is owned by the same assignee as the present invention, Hendrickson USA, L.L.C. The improved bearing retainer includes a circumferentially-extending groove formed in an inner surface of the hub adjacent an outboard surface of the wheel hub, and a retainer ring that seats in the groove. While the improved bearing retainer works satisfactorily for its intended function, it has been found that, under certain conditions during assembly of the retainer ring, the ring may contact and score the surface of the hub bore. Scoring of the surface of the hub bore may impair the integrity of the hub surface, which may in turn reduce the ability of the above-described O-ring to provide an optimum seal, which in turn undesirably increases the potential for bearing lubricant to leak out of the wheel end assembly, and the potential for contaminants to enter the assembly.

Moreover, it is desirable to provide a structure that reduces potential corrosion at the interface of the hubcap and the outboard face of the hub. More particularly, when a heavy-duty vehicle travels over roads and there is moisture on the road surface, road spray may be generated. Road spray is the moisture that is caused to move upward from the road surface by the vehicle tires toward the wheel end assembly, including the hubcap and the hub. Because the hubcap and the hub typically are unprotected from road spray, when the vehicle travels over wet roads, road spray tends to collect on the hubcap and the hub, including at the interface between the hubcap and the hub.

It is known in the art that road spray may include salt or other chemicals that are present on the road surface. For example, salt from salt water is often present on roads near a sea, and rods in areas with abundant ice or snow are often treated with certain chemicals for anti-icing or de-icing, such as sodium chloride, calcium chloride, magnesium chloride, and mixtures thereof. When road spray with salt and/or chemicals collects at the interface between the hubcap and the hub, and the hubcap directly contacts the outboard face of the hub, the moisture and salt and/or other chemicals accumulate at this interface. The accumulation of moisture and salt and/or other chemicals at the interface between the hubcap and the hub may cause galvanic corrosion cells to form. These corrosion cells then tend to propagate, and if there is significant propagation of corrosion cells at the interface between the hubcap and the hub, it may impair the seal between the hubcap and the hub. In the event the seal is impaired, the potential for bearing lubricant to leak out of the wheel end assembly, and the potential for contaminants to enter the assembly, is undesirably increased. In addition, if the corrosion cells continue to propagate, they may spread to components such as the axle spindle nut and/or the bearings, which may reduce the life of such components.

As a result, it is desirable to provide a sealing system that includes a structure which reduces corrosion at the interface of the hubcap and an outboard face of the hub. It is also desirable to provide an additional barrier that prevents contaminants and/or corrosion from entering the wheel end assembly, thereby preserving the life of the assembly.

For these reasons, there is a need in the art to develop an outboard sealing system for a heavy-duty vehicle wheel end assembly that retains lubricant in the wheel end assembly and prevents contaminants from entering the wheel end assembly, retains the relative position of the outboard bearing in the hub during servicing of a brake rotor or components of the wheel end assembly, reduces corrosion at the interface of the hubcap and an outboard face of the hub, and prevents corrosion from entering the wheel end assembly. The outboard sealing system for a heavy-duty vehicle wheel end assembly of the present invention satisfies this need.

BRIEF SUMMARY OF THE INVENTION

An objective of the present invention is to provide an outboard sealing system for a heavy-duty vehicle wheel end assembly that retains lubricant in the wheel end assembly.

Another objective of the present invention is to provide an outboard sealing system for a heavy-duty vehicle wheel end assembly that prevents contaminants from entering the wheel end assembly.

Still another objective of the present invention is to provide an outboard sealing system for a heavy-duty vehicle wheel end assembly that retains the relative position of the outboard bearing in the hub during servicing of a brake rotor or components of the wheel end assembly.

Yet another objective of the present invention is to provide an outboard sealing system for a heavy-duty vehicle wheel end assembly that reduces corrosion at the interface of the hubcap and an outboard face of the hub.

A further objective of the present invention is to provide an outboard sealing system for a heavy-duty vehicle wheel end assembly that prevents corrosion from entering the wheel end assembly.

This objective and others are obtained by the outboard sealing system for a heavy-duty vehicle wheel end assembly of the present invention. In an exemplary embodiment of the invention, a wheel end assembly includes an inboard bearing and an outboard bearing that are immovably mounted on an outboard end of an axle spindle. A hub is rotatably mounted on the inboard and outboard bearings, and an axle spindle nut threadably engages the axle spindle and abuts the outboard bearing. A hubcap is mounted on an outboard end of the hub. The outboard sealing system includes a seal that is disposed axially between the outboard bearing and the hubcap, and which extends radially between the axle spindle nut and a surface of a bore formed in the hub. The seal reduces a flow of lubricant from a cavity formed in the hub into the hubcap.

BRIEF DESCRIPTION OF THE SEVERAL VIEWS OF THE DRAWINGS

The preferred embodiment of the invention, illustrative of the best mode in which Applicants have contemplated applying the principles of the invention, is set forth in the following description and is shown in the drawings, and is particularly and distinctly pointed out and set forth in the appended claims.

Similar numerals refer to similar parts throughout the drawings.

DETAILED DESCRIPTION OF THE INVENTION

Figure 1:
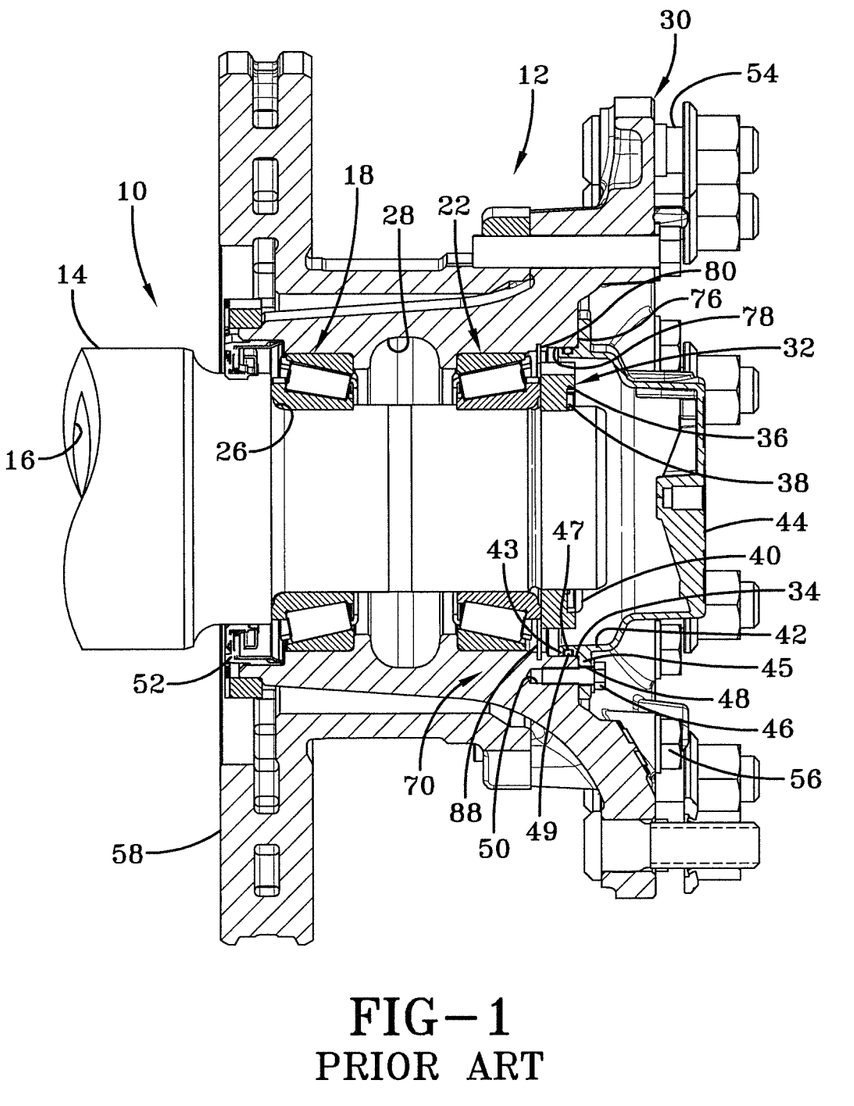
FIG. 1 is a fragmentary cross-sectional view of a prior art axle spindle and wheel end assembly, shown with a hubcap and brake rotor installed on the wheel end assembly.

Turning to FIG. 1, in order to better understand the outboard sealing system of the present invention and the environment in which it operates, a prior art axle spindle and wheel end assembly for a heavy-duty vehicle is shown and now will be described. An axle 10 depends from and extends transversely across the trailer of a heavy-duty tractor-trailer (not shown). A typical heavy-duty tractor-trailer includes one or more non-drive axles 10 suspended from the trailer, with each of the axles having a wheel end assembly 12 mounted on each end of the axle. Since each of the ends of axle 10 and its associated wheel end assembly 12 are generally identical, only one axle end and wheel end assembly 12 will be described herein. Axle 10 includes a central tube (not shown), and an axle spindle 14 is integrally connected by any suitable means, such as welding, to each end of the central tube. The axle central tube generally is tubular-shaped and is formed with an internal cavity (not shown). Axle spindle 14 is formed with a corresponding internal cavity 16.

Wheel end assembly 12 includes a bearing assembly having an inboard bearing 18 and an outboard bearing 22 that are immovably mounted on the outboard end of axle spindle 14. More particularly, inboard bearing 18 is mounted on the outer diameter of axle spindle 14 with its inboard surface in abutment with a shoulder 26 formed in the axle spindle. A cavity 28 is defined by inboard and outboard bearings 18, 22, axle spindle 14 and a hub 30. A bearing spacer (not shown) optionally is disposed between bearings 18, 22 in cavity 28 to conveniently maintain proper spacing between the bearings.

Hub 30 is rotatably mounted on inboard and outboard bearings 18, 22 in a manner known to those skilled in the art. An axle spindle nut assembly 32 is installed on axle spindle 14 to secure bearings 18, 22 and hub 30 on the axle spindle. Axle spindle nut assembly 32 is more fully described in U.S. Pat. No. 8,016,531, which is owned by the assignee of the present invention, Hendrickson USA, L.L.C., and includes an optional inner washer (not shown), an axle spindle nut 36, an outer washer 38, and at least one screw 40. Axle spindle nut 36, washer 38 and screw 40 cooperate to secure bearings 18, 22 and hub 30 in place, and to provide the proper clamp force on bearings 18, 22 and any spacer. More particularly, nut 36 threadably engages axle spindle 14 and abuts the outboard end of outboard bearing 22. Nut 36 receives outer washer 38 in an assembled state, and the outer washer is formed with a tab (not shown) on its inner periphery, which engages a keyway (not shown) formed in axle spindle 14 to prevent the outer washer from rotating once it is installed on the axle spindle. Teeth formed on each one of nut 36 and outer washer 38 enable the nut and washer to positively mechanically engage and interlock with one another, thereby preventing the nut from undesirably rotating after installation on axle spindle 14.

A hubcap 44 is mounted on the outboard end of hub 30 and closes the outboard end of wheel end assembly 12. More particularly, hubcap 44 includes a generally axially-extending cylindrical sidewall 42, a lip 43 that is formed inboardly of the sidewall and which is received in a bore 34 formed in an outboard end of hub 30, and a shoulder 45 that extends radially outwardly from the sidewall adjacent an outboard surface 76 of the hub. Hubcap 44 is secured to hub 30 by a plurality of bolts 46 that each pass through a respective one of a plurality of openings 48 foil led in hubcap shoulder 45, and which threadably engage a respective one of a plurality of aligned threaded openings 50 formed in the hub. Hubcap lip 43 is formed with a channel 47, and an elastomeric O-ring 49 seats in the channel and contacts an inner surface 78 of hub bore 34 to form a seal between hubcap 44 and the hub. Hubcap 44 is more fully described in U.S. Pat. No. 7,731,300, which is owned by the assignee of the present invention, Hendrickson USA, L.L.C.

A main continuous seal 52 is rotatably mounted on the inboard end of wheel end assembly 12 and closes the inboard end of the assembly. More particularly, seal 52 is mounted on wheel end assembly 12 in a suitable manner and radially bridges hub 30 and axle spindle 14 to seal cavity 28. In order to maintain proper lubrication and operation of inboard and outboard bearings 18, 22, a suitable amount of lubricant (not shown), such as semi-fluid grease, is introduced into cavity 28. A plurality of interference-fit studs 54 are used to mount a tire rim and tire (not shown) on wheel end assembly 12, and bolts 56 are used to mount a brake rotor 58 to hub 30. It is to be understood that the particular configuration of hub 30 and brake rotor 58 of a disc-brake system is shown by way of example, as the outboard sealing system of the present invention finds application in conjunction with all types of brake systems, including disc brake and drum brake systems.

Wheel end assembly 12 also includes a bearing retainer 70 to retain the relative position of outboard bearing 22 in hub 30 during servicing of brake rotor 58 or of components of the wheel end assembly. More particularly, bearing retainer 70 includes a circumferentially-extending groove 80 formed in hub bore surface 78 adjacent hub outboard surface 76, and a retainer ring 88 that seats in the groove. Bearing retainer 70 retains the relative position of outboard bearing 22 in hub 30 as more fully described in U.S. patent application Ser. No. 12/880,757, which is owned by the same assignee as the present invention, Hendrickson USA, L.L.C.

As described above, while hubcap 44 provides precise alignment of the hubcap with axle spindle 14, and provides a seal to prevent bearing lubricant from leaking out of the outboard end of wheel end assembly 12 and to prevent water and contaminants from entering the wheel end assembly, it is desirable to provide an even more effective seal. In addition, while bearing retainer 70 properly retains the relative position of outboard bearing 22 on hub 30 during disassembly and/or reassembly of wheel end assembly 12, under certain conditions during placement of retainer ring 88 in groove 80, the ring may contact and score hub bore surface 78. Such potential scoring may reduce the ability of O-ring 49 to provide an optimum seal with hub 30, making it desirable to reduce or eliminate any scoring while retaining the relative position of the outboard bearing. Moreover, it is desirable to reduce potential galvanic corrosion at the interface of hubcap shoulder 45 and hub outboard surface 76 in order to maintain an optimum outboard seal and thus further reduce the possibility of bearing lubricant leaking out of the outboard end of wheel end assembly 12, and the possibility of contaminants entering the wheel end assembly. It is also desirable to provide an additional barrier that prevents corrosion from entering the wheel end assembly, thereby preserving the life of the assembly.

The outboard sealing system for a heavy-duty vehicle wheel end assembly of the present invention retains lubricant in the wheel end assembly and prevents contaminants from entering the wheel end assembly, retains the relative position of the outboard bearing in the hub during servicing of a brake rotor or components of the wheel end assembly, reduces corrosion at the interface of the hubcap and an outboard face of the hub, and provides an additional barrier that prevents corrosion from entering the wheel end assembly, as now will be described.

Figure 2:
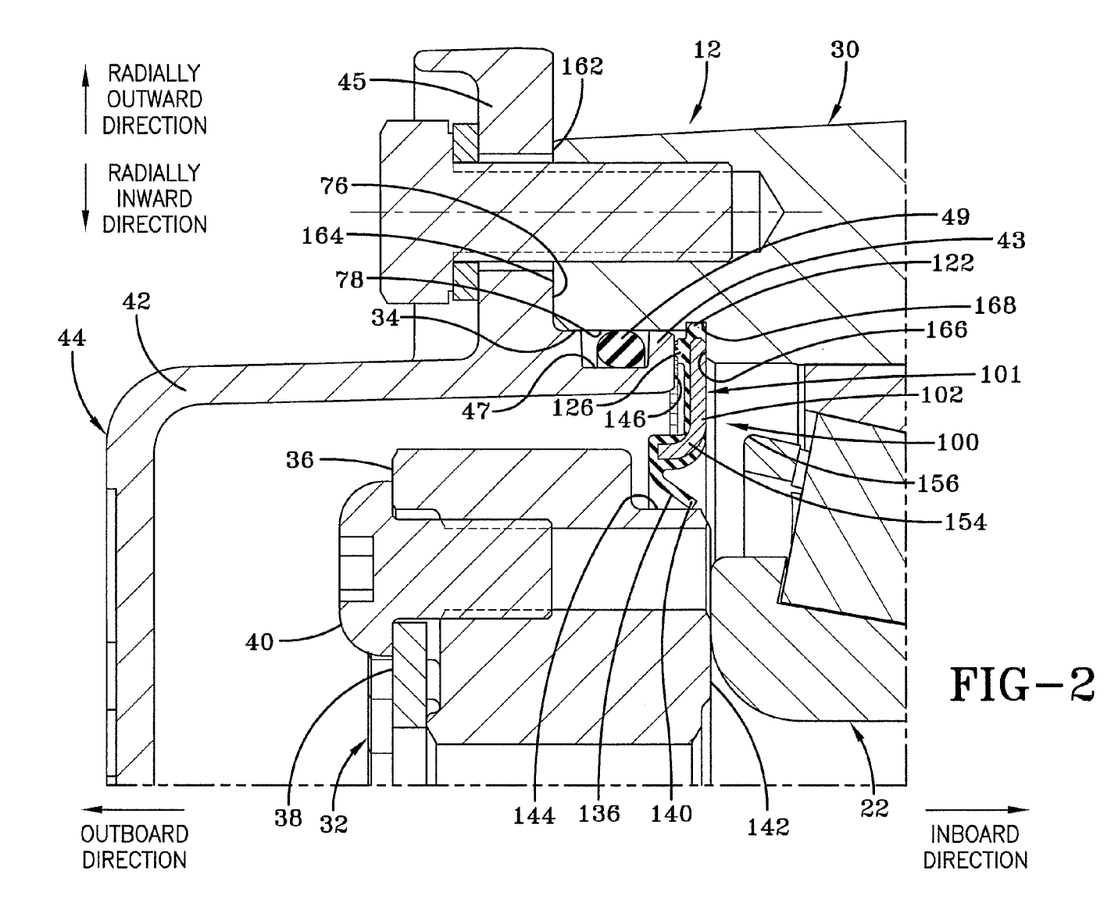
FIG. 2 is an enlarged fragmentary cross-sectional view of a portion of a wheel end assembly, including an exemplary embodiment of the outboard sealing system of the present invention, shown with a hubcap installed on the wheel end assembly.

With reference now to FIGS. 2-6, an exemplary embodiment of an outboard sealing system for a heavy-duty vehicle wheel end assembly of the present invention is shown and indicated generally at 100. Turning to FIG. 2, outboard sealing system 100 includes a seal 101 that is disposed between outboard bearing 22 and hubcap 44 of wheel end assembly 12, and extends radially between and cooperates with axle spindle nut 36 and surface 78 of hub bore 34.

Figure 3:
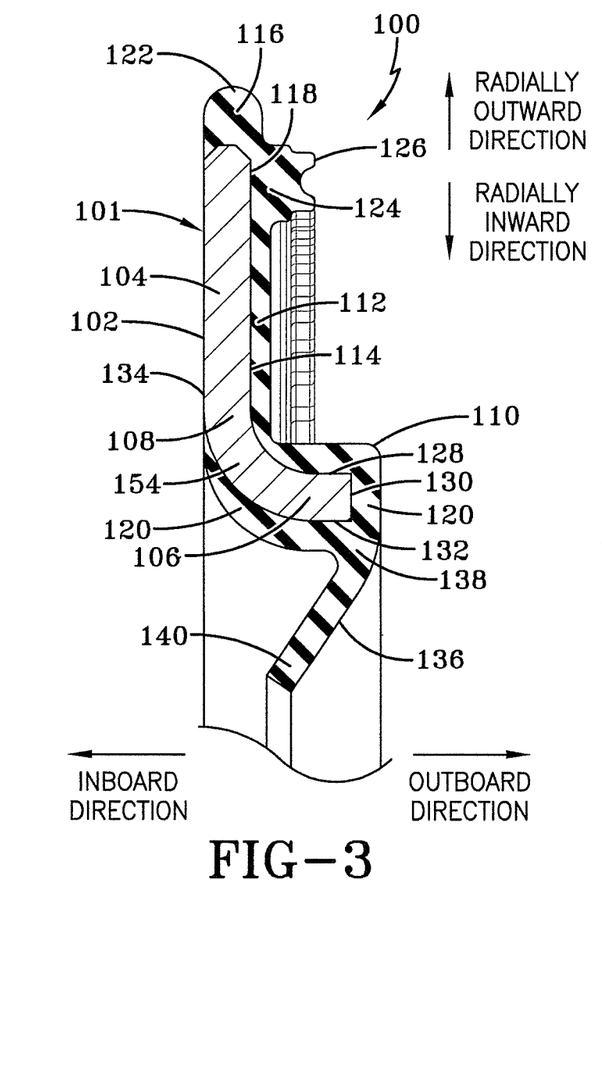
FIG. 3 is a greatly enlarged cross-sectional view of the exemplary embodiment of the outboard sealing system of the present invention shown in FIG. 2.

With particular reference to FIG. 3, seal 101 of outboard sealing system 100 preferably includes a multiple-piece construction, including a core 102 and an elastomeric member 110, which is bonded to the core, as will be described below. Core 102 is generally L-shaped, and includes a radially-extending member 104 and an axially-extending member 106. Axially-extending member 106 extends axially outboardly from a radially inward end 108 of radially-extending member 104. Core 102 preferably is formed of steel or other robust material in order to provide stiffness to outboard seal 101, which increases the section modulus of the seal. That is, core 102 increases the strength and stiffness of the cross section of seal 101, which in turn increases the overall strength and stiffness of the seal.

To provide sealing characteristics, elastomeric or polymeric member 110, formed of a material such as nitrile rubber (NBR), and is bonded to core 102 by means known to those skilled in the art. More particularly, a radially outward portion 116 of elastomeric member 110 is bonded to a radially outward surface 118 of radially-extending member 104 of core 102 to form a radially outwardly-extending protrusion or bump 122, which preferably includes a rounded profile that interfaces with hub bore surface 78, as will be described in greater detail below. Elastomeric member 110 continues radially inwardly from protrusion 122, forming an outboard portion 112 that is bonded to an outboard surface 114 of radially-extending member 104 of core 102. At a radially outward end 124 of outboard portion 112, elastomeric member 110 forms outboardly-extending feature 126 that interfaces with hubcap lip 43, as will be described in greater detail below.

Elastomeric member 110 continues along core 102 from outboard portion 112, forming an encapsulation portion 120 that extends about and encapsulates axially-extending member 106 of the core. Encapsulation member 120 extends about a radially outward surface 128 of axially-extending core member 106, an outboard surface 130 of the axially-extending core member, and a radially inward surface 132 of the axially-extending core member, terminating at an inboard surface 134 of radially inward end 108 of radially-extending member 104. Elastomeric member 110 also forms a fin 136, which extends radially inwardly and generally axially inboardly from a radially inward and axially outboard area 138 of encapsulation portion 120. A radially inward end 140 of fin 136 interfaces with axle spindle nut 36, as will be described in greater detail below.

Returning to FIG. 2, the construction of seal 101 of outboard sealing system 100 enables the seal to extend radially between hub bore surface 78 and axle spindle nut 36, while contacting hubcap lip 43 to form a dam between outboard bearing 22 and hubcap 44, thereby reducing the outboard flow of lubricant, which desirably maintains lubricant at bearings 18, 22 and hub cavity 28 (FIG. 1). More particularly, an axial stop feature 166 is formed in or is present in hub bore 34. For example, axial stop feature 166 may be a radially-extending shoulder 166 that is formed on inner surface 78 of hub bore 34. A circumferentially-extending groove 168 may optionally be formed in inner surface 78 of hub bore 34 adjacent shoulder 166. The radially outward area of seal 101 includes protrusion or bump 122, which firmly seats on inner surface 78 of hub bore 34, and also seats against shoulder 166. If optional groove 168 is formed in inner surface 78 of hub bore 34, protrusion or bump 122 of seal 101 mechanically engages the groove and also seats against shoulder 166. Because protrusion or bump 122 is formed of an elastomeric material, the protrusion provides a seal with hub bore surface 78, which reduces the flow of lubricant between the protrusion and the hub bore surface.

The compressibility of protrusion or bump 122 also provides a flexibility at the interface between seal 101 and hub bore surface 78 that desirably allows a stack-up of axial tolerances. In addition, because protrusion or bump 122 is formed of elastomeric material, the protrusion prevents scoring or damage of hub bore surface 78 when outboard seal 101 is inserted into hub 30, which maintains the integrity of the hub bore surface to improve the effectiveness of the seal of hubcap O-ring 49 against the hub bore surface.

The radially inward area of seal 101 of outboard sealing system 100 includes fin 136, and radially inward end 140 of the fin seats against axle spindle nut 36. As will be described in greater detail below, core 102 of seal 101 provides stiffness for the seal, which enables it to be inserted into hub bore 34 independently of axle spindle nut 36. When spindle nut 36 is installed on axle spindle 14, an outer diameter or surface 144 of an inboard end 142 of the spindle nut contacts fin inward end 140. As spindle nut 36 is tightened on axle spindle 14 (FIG. 1), outer surface 144 moves inboardly past fin 136 while contacting the fin. As spindle nut 36 moves inboardly, the elastomeric construction of fin 136, coupled with its radially inward and generally axially inboard angle of extension, enable the fin to flex and remain in secure contact with outer surface 144 of spindle nut proximate inboard end 142. Because fin 136 flexes and contacts the entire circumference of outer surface 144 of spindle nut 36, it creates secure, yet removable, contact against the spindle nut. The flexing of fin 136 enables easy installation of spindle nut 36 and engagement of seal 101 with the spindle nut, and also easy removal of the spindle nut.

By seating on and engaging spindle nut 36, fin 136 enables seal 101 to complete the extension of a dam radially between hub bore surface 78 and axle spindle nut 36 outboardly of outboard bearing 22, thereby reducing the outboard flow of lubricant. In this manner, outboard sealing system 100 includes seal 101, which cooperates with axle spindle nut 36 and hub bore surface 78 to desirably retain lubricant at bearings 18, 22 and hub cavity 28, and to reduce the ability of contaminant to pass to the bearings and the hub cavity.

Due to the axial location of seal 101 at the interface between axle spindle nut 36 and outboard bearing 22, and the radial extension of the seal from the axle spindle nut to hub bore surface 78, outboard sealing system 100 also specifically retains lubricant such as semi-fluid grease at the interface between the outboard bearing and the spindle nut. By retaining semi-fluid grease at the interface between axle spindle nut 36 and outboard bearing 22, outboard sealing system 100 maintains the lubricant at an optimum location for lubrication of the bearings. In addition, because it is desirable for spindle nut 36 to be positioned to maintain a light preload on bearings 18, 22, as known to those skilled in the art, when the vehicle turns a corner during operation, the resulting forces may generate deflection in wheel end assembly 12, which may in turn create a slight temporary gap between the spindle nut and the outboard bearing. By retaining lubricant at the interface between axle spindle nut 36 and outboard bearing 22, outboard sealing system 100 enables the lubricant to wick into the gap, thereby lubricating this interface, which may reduce fretting or spalling of the outboard bearing or the spindle nut.

Moreover, by reducing the outboard flow of lubricant into hubcap 44, outboard sealing system 100 desirably reduces the amount of lubricant such as semi-fluid grease that travels into the hubcap. When a technician removes hubcap 44 during servicing of wheel end assembly 12, minimal semi-fluid grease remains in the hubcap, reducing any inconvenience for the technician, thereby enabling easier servicing of the wheel end assembly.

The radial extension of seal 101 from axle spindle nut 36 to hub bore surface 78 also prevents damage to bearings 18, 22 in the event of a failure of a component of a tire inflation system (not shown) or a vent tube (not shown). More particularly, axle 10 and/or wheel end assembly 12 may be equipped with a tire inflation system or a vent tube. Tire inflation systems typically include components, such as a rotary union, which are mounted in the outboard end of axle spindle 14, or to hubcap 44. In the event that a rotary union experiences a failure, a portion of the rotary union structure may undesirably freely travel in hubcap 44. In addition, vent tubes typically communicate with atmosphere, and are in fluid communication with the interior of axle 10 or hubcap 44. In the event that a vent tube experiences a failure, contaminants may be introduced into the interior of hubcap 44. However, the radial extension of seal 101 of outboard sealing system 100 from axle spindle nut 36 to hub bore surface 78 creates a dam that blocks the travel of components and/or contaminants from hubcap 44 inboardly to bearings 18, 22, thereby preventing damage to the bearings and preserving bearing life.

Figure 4:
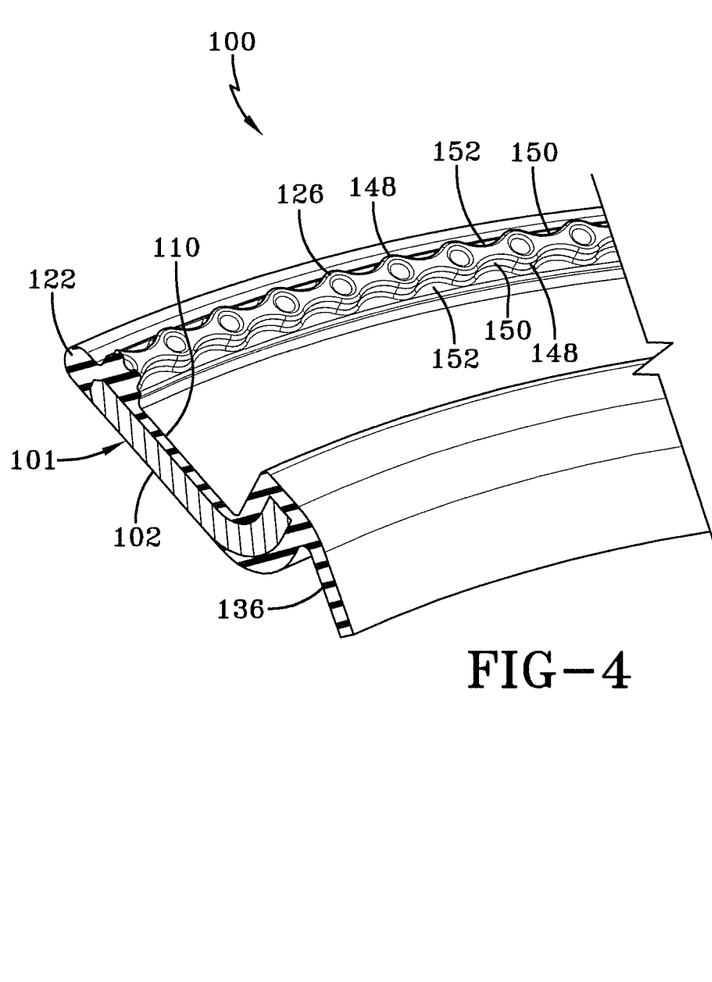
FIG. 4 is a greatly enlarged fragmentary perspective view of the cross section and a portion of the outboard surface of the outboard sealing system of the present invention shown in FIG. 2.
Figure 5:
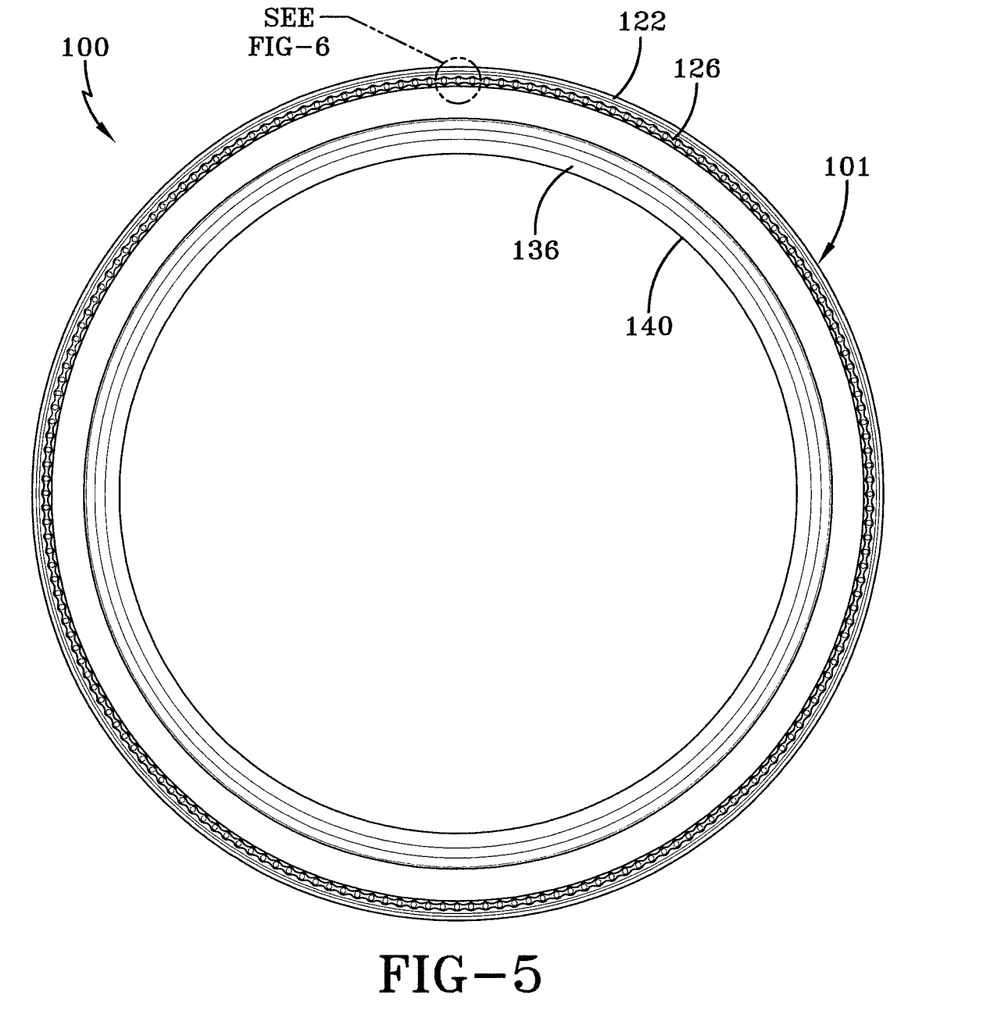
FIG. 5 is an elevational view of the outboard surface of the outboard sealing system of the present invention shown in FIG. 2.
Figure 6:
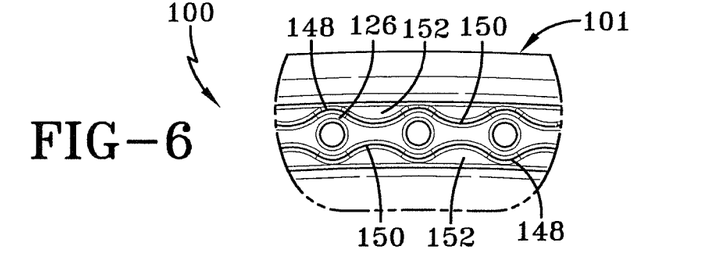
FIG. 6 is a greatly enlarged fragmentary elevational view of the circled portion of the outboard sealing system of the present invention shown in FIG. 5.

Also included in the sealing engagement of seal 101 is outboardly-extending feature 126, which interfaces with hubcap lip 43. More particularly, feature 126 seats against and engages an inboard surface 146 of hubcap lip 43 when hubcap 44 is installed on hub 30. Turning now to FIGS. 4-6, feature 126 is formed with variable shapes, geometry, and/or thickness in order to provide an effective seal. More particularly, feature 126 may include a series of alternating radially convex curves or shapes 148 and radially concave curves or shapes 150. When inboard surface 146 of hubcap lip 43 (FIG. 2) seats against feature 126, convex shapes 148 are compressed in order to seal against the hubcap lip. The compressed material from convex shapes 148 moves to open areas 152 adjacent concave shapes 150, thereby reducing the overall compression set, that is, the permanent deformation, of elastomeric feature 126. With this construction, feature 126 enables seal 101 to form an effective seal with inboard surface 146 of hubcap lip 43, while reducing the compression set of the feature, which extends the life of the seal. In addition, the compressibility of feature 126 also provides flexibility at the interface between seal 101 and inboard surface 146 of hubcap lip 43 that desirably allows a stack-up of axial tolerances. Moreover, the compressibility of feature 126 against the entire circumference of inboard surface 146 of hubcap lip 43 creates a "suction cup" effect against hubcap 44 for secure contact which desirably helps to resist rotation of seal 101 when it is seated in hub 30.

Another aspect of outboard sealing system 100 is the ability of seal 101 to relieve increased pressure due to increased operating temperatures. For example, during vehicle operation, it is known in the art that the temperature in wheel end assembly 12 (FIG. 1) increases due to operating conditions and environmental conditions. When the temperature inside wheel end assembly 12 increases, the pressure inside the wheel end assembly also increases. It is known in the art that significant pressure increases in wheel end assembly 12 may damage the sealing components of the wheel end assembly, so a seal in the wheel end assembly needs to accommodate relief of excess pressure.

Outboard sealing system 100 utilizes a keyway (not shown) that is formed in axle spindle 14 (FIG. 1). More particularly, axle spindle nut 36 seats on axle spindle 14 as described above. Axle spindle 14 is formed with a keyway as known in the art, and washer 38 of spindle nut assembly 32 is formed with a tab (not shown) that engages the keyway. The tab on washer 38 does not completely block the keyway on axle spindle 14, thereby enabling air to flow along the keyway. Because seal 101 of outboard sealing system 100 extends radially between hub bore surface 78 and axle spindle nut outer surface 144, as shown in FIG. 2, the seal is positioned radially outwardly of the keyway and does not contact or block the keyway. This position of seal 101 enables air to flow along the keyway to enable pressure equalization, thereby preserving the integrity and the life of the seal and other components of wheel end assembly 12.

Moreover, by not obstructing the keyway, seal 101 enables oil that separates out from semi-fluid grease during vehicle operation to migrate along the keyway to lubricate certain contact areas. In the prior art, fretting may occur at the contact area of the bore of the cone of outboard bearing 22 and the surface of axle spindle 14, as it is difficult for semi-fluid grease to lubricate the contact area. By allowing oil from semi-fluid grease to flow along the keyway, seal 101 of outboard sealing system 100 encourages lubrication of the contact area of the bore of the cone of outboard bearing 22 and the surface of axle spindle 14, potentially reducing fretting at the contact area, which desirably increases the performance and life of the components of wheel end assembly 12.

The structure of seal 101 of outboard sealing system 100 also retains the relative position of outboard bearing 22 in hub 30 during servicing of brake rotor 58 (FIG. 1) or components of wheel end assembly 12. As described above, during servicing of brake rotor 58 or components of wheel end assembly 12, hub 30 is removed from axle spindle 14. Removal of hub 30 typically involves a technician removing spindle nut assembly 32 from axle spindle 14, and then pulling the hub, together with bearings 18, 22 and main seal 52, as a unit, off of the axle spindle. Once spindle nut assembly 32 is removed, structural means are needed to prevent outboard bearing 22 from sliding out of the outboard end of hub 30. Seal 101 provides such structural means without scoring hub bore surface 78.

More particularly, referring now to FIG. 2, generally L-shaped core 102 preferably is formed of steel or other robust material to provide stiffness for seal 101, which increases the section modulus and thus the overall strength and stiffness of the seal. With additional reference to FIGS. 3 and 5, the stiffness of seal 101 enables it to exhibit increased hoop strength, which combines with elastomeric bump 122 to enable the seal to firmly engage and seat on hub bore surface 78 and/or in optional groove 168, without scoring the hub bore surface. Such secure seating of seal 101 on hub bore surface 78 and/or in optional groove 168 in hub bore 34 enables the seal to remain in the hub bore when hubcap 44 and axle spindle nut 36 are removed.

In addition, core 102 of seal 101 extends radially inwardly from hub bore surface 78 a distance that is sufficient to ensure that the seal core is proximate outboard bearing 22 to retain the relative position of the bearing. More specifically, a radially inward and axially inboard corner 154 of the core extends radially inwardly slightly past a radially outward and axially outboard corner 156 of outboard bearing 22. Because seal 101 is axially adjacent outboard corner 156 of outboard bearing 22, and core 102 extends radially inwardly past the outboard corner of the outboard bearing, the seal provides contact with the outboard bearing if the bearing moves in an outboard direction. The positive mechanical engagement of seal 101 on hub bore surface 78 and/or in optional groove 168 formed in the hub bore surface prevents further movement of outboard bearing 22 in an outboard direction, and thus retains the relative position of the outboard bearing during servicing of brake rotor 58 or of components of wheel end assembly 12.

By preventing outboard bearing 22 from shifting or moving out of hub 30, seal 101 of outboard sealing system 100 prevents wheel end assembly 12 from being exposed to contaminants during servicing, thereby optimizing the life of bearings 18, 22. In addition, by preventing such movement of outboard bearing 22 during disassembly or reassembly of wheel end assembly 12, seal 101 reduces the possibility of tipping or shifting of hub 30, which in turn reduces the possibility of damage to components of the wheel end assembly, such as main seal 52.

By retaining the relative position of outboard bearing 22, seal 101 of outboard sealing system 100 also enables a technician to focus on installation of spindle nut assembly 32 onto axle spindle 14. By focusing on installation of spindle nut assembly 32, rather than on the position of outboard bearing 22, the technician is more likely to install the spindle nut assembly properly. Proper installation of spindle nut assembly 32 creates an optimum clamp force on bearings 18, 22, and desirably optimizes the life of the bearings.

With reference again to FIG. 2, outboard sealing system 100 reduces corrosion at the interface of hubcap 44 and outboard surface 76 of hub 30, and provides an additional barrier that prevents corrosion from entering wheel end assembly 12, further increasing the life of the wheel end assembly. As described above, the accumulation of moisture and salt and/or other chemicals at an interface 162 between hubcap 44 and hub outboard surface 76 may cause corrosion cells to form at the interface. If there is significant propagation of corrosion cells at interface 162, the ability of hubcap 44 to seat and seal against hub 30 may be impaired, which may undesirably increase the potential for bearing lubricant to leak out of wheel end assembly 12, and the potential for contaminants to enter the assembly. In addition, if the corrosion cells continue to propagate, they may spread to components such as axle spindle nut 36 and/or bearings 18, 22, which may reduce the life of such components.

Outboard sealing system 100 preferably includes seal 101 and a corrosion barrier 164 disposed between hubcap shoulder 45 and hub outboard surface 76. Corrosion barrier 164 reduces or prevents metal-to-metal contact at interface 162 to inhibit galvanic corrosion. Corrosion barrier 164 may be a discrete gasket-like structure formed of an elastomeric material or a polymeric material, such as a polyester film including Mylar®, which is a registered trademark of DuPont Teijin Films, or a coating that is applied to one or both of hubcap shoulder 45 and hub outboard surface 76. In addition, corrosion barrier 164 may include an adhesive, in which a tape or film such as a polyester film includes an adhesive on the side facing hubcap 44 to secure attachment of the barrier to the hubcap, and/or an adhesive on the side facing hub outboard surface 76 to secure attachment of the barrier to the hub. Moreover, corrosion barrier 164 may include a coating that is applied to the exterior of hubcap 44, such as anodizing of the hubcap, or electro-coating or electro-deposition of ceramic or other compounds on the hubcap, which may be employed in combination with, or without, the above-described gasket structure, adhesive, and/or coating on hubcap shoulder 45 and hub outboard surface 76. The cooperation between seal 101 and corrosion barrier 164 enables outboard sealing system 100 to retard the passage and resulting accumulation of moisture and corrosive salt and/or anti-icing chemicals at interface 162, thereby resisting the formation of corrosion cells, which in turn provides improved sealing of wheel end assembly 12.

Moreover, if any corrosion cells form, seal 101 provides an additional barrier that prevents corrosion from entering wheel end assembly 12. Specifically, seal 101 is axially located at the interface between axle spindle nut 36 and outboard bearing 22, and radially extends from the axle spindle nut to hub bore surface 78. In the event that corrosion cells form at interface 162, propagation of the cells into wheel end assembly 12 is likely to occur along hub bore surface 78 or hubcap lip 43. Seal 101 is positioned between these surfaces and bearings 18, 22, and also between these surfaces and axle spindle nut 36, and includes corrosion-resistant elastomeric member 110. The location and construction of seal 101 of outboard sealing system 100 thus acts to provide an additional barrier against the propagation of corrosion cells, thereby preventing corrosion from entering wheel end assembly 12, which preserves the life of the assembly.

In this manner, the structure of outboard sealing system 100 of the present invention retains lubricant in heavy-duty vehicle wheel end assembly 12 and prevents contaminants from entering the wheel end assembly, thereby increasing the life of the wheel end assembly. In addition, outboard sealing system 100 reduces migration of lubricant into hubcap 44, and specifically retains lubricant such as semi-fluid grease at the interface between outboard bearing 22 and spindle nut 36, which is an optimum location for lubrication of the bearings. By retaining lubricant at the interface between axle spindle nut 36 and outboard bearing 22, outboard sealing system 100 enables the lubricant to wick between the spindle nut and the outboard bearing gap, thereby lubricating the interface, which may reduce fretting or spalling of the outboard bearing or the spindle nut.

By reducing the outboard flow of lubricant into hubcap 44, outboard sealing system 100 also enables easier servicing of the wheel end assembly. Moreover, the radial extension of seal 101 from axle spindle nut 36 to hub bore surface 78 also creates a dam that blocks the travel of components and/or contaminants from hubcap 44 inboardly to bearings 18, 22, in the event of a failure of a component of a tire inflation system or a vent tube, which prevents damage to the bearings and preserves bearing life.

Outboard sealing system 100 also retains the relative position of outboard bearing 22 in hub 30 during servicing of brake rotor 58 or components of wheel end assembly 12, thereby minimizing potential problems encountered during the disassembly and/or reassembly of the wheel end assembly. Moreover, outboard sealing system 100 reduces corrosion at interface 162 of hubcap 44 and outboard surface 76 of hub 30, which provides improved sealing of wheel end assembly 12, and provides an additional barrier that prevents corrosion from entering the wheel end assembly, both of which increase the life of the wheel end assembly.

Seal 101 of outboard sealing system 100 is also easy to install and remove. Because seal 101 includes elastomeric member 110 and radially-pliable bump or protrusion 122, the seal is able to flex for installation into hub bore 34, and thus may be installed by a technician without the use of tools. In addition, for easy removal, core 102 enables a technician to apply specific force on seal 101, which causes the seal to tip relative to hub bore 34, at which point the seal can be readily grasped and removed without use of tools. Moreover, the construction of seal 101, including core 102 and elastomeric member 110, enables outboard sealing system 100 to be resistant to damage, and thus reusable.

The present invention also includes methods for retaining lubricant in a heavy-duty vehicle wheel end assembly, preventing contaminants from entering a heavy-duty vehicle wheel end assembly, reducing migration of lubricant into a hubcap, lubricating an interface between an outboard bearing and a spindle nut by retaining lubricant at the interface, blocking components and/or contaminants from traveling from a hubcap inboardly to the bearings, retaining the relative position of the outboard bearing in the hub during servicing of a brake rotor or components of a heavy-duty vehicle wheel end assembly, reducing corrosion at the interface of the hubcap and an outboard face of the hub of a heavy-duty vehicle wheel end assembly, and providing an additional barrier that prevents corrosion from entering the wheel end assembly. The methods include steps in accordance with the description that is presented above and shown in FIGS. 2-6.

It is to be understood that the structure of the above-described outboard seal for a heavy-duty vehicle wheel end assembly of the present invention may be altered or rearranged, or certain components and/or features omitted or added, without affecting the overall concept or operation of the invention. In addition, outboard sealing system 100 may be formed of materials other than those described above, without affecting the overall concept or operation of the invention. It is also to be understood that the present invention finds application in all types of axles and/or heavy-duty wheel end assemblies known to those skilled in the art, including other types of axles and/or wheel end assemblies than those shown and described herein and known to those skilled in the art, including other non-drive axles and drive axles, without affecting the concept or operation of the invention.

Moreover, the present invention may be used in conjunction with any known lubricant such as oil, grease, semi-fluid grease, and the like, with appropriate structural adaptations depending on the nature of the specific lubricant that is employed, without affecting the concept or operation of the invention. Outboard sealing system 100 may be employed in conjunction with any type of brake system known in the art, for example, drum brake and disc brake systems, without affecting the concept or operation of the invention.

Accordingly, the improved outboard sealing system for a heavy-duty vehicle wheel end assembly is simplified, provides an effective, safe, inexpensive, and efficient structure which achieves all the enumerated objectives, provides for eliminating difficulties encountered with prior art sealing systems, and solves problems and obtains new results in the art.

In the foregoing description, certain terms have been used for brevity, clarity and understanding; but no unnecessary limitations are to be implied therefrom beyond the requirements of the prior art, because such terms are used for descriptive purposes and are intended to be broadly construed. Moreover, the present invention has been described with reference to an exemplary embodiment. It shall be understood that this illustration is by way of example and not by way of limitation, as the scope of the invention is not limited to the exact details shown or described. Potential modifications and alterations will occur to others upon a reading and understanding of this disclosure, and it is understood that the invention includes all such modifications and alterations and equivalents thereof.

Having now described the features, discoveries and principles of the invention, the manner in which the improved outboard sealing system for a heavy-duty vehicle wheel end assembly is constructed, arranged and used, the characteristics of the construction and arrangement, and the advantageous, new and useful results obtained; the new and useful structures, devices, elements, arrangements, parts and combinations are set forth in the appended claims.

What is claimed is:

1. An outboard sealing system for a heavy-duty vehicle wheel end assembly, said wheel end assembly including an inboard bearing and an outboard bearing being immovably mounted on an outboard end of an axle spindle, a hub being rotatably mounted on said inboard and outboard bearings, an axle spindle nut threadably engaging said axle spindle and abutting the outboard bearing, and a hubcap being mounted on an outboard end of said hub, said outboard sealing system comprising:

a seal being disposed axially between said outboard bearing and said hubcap and extending radially between said axle spindle nut and a surface of a bore formed in said hub, whereby said seal reduces a flow of lubricant from a cavity formed in said hub into said hubcap.

2. The outboard sealing system for a heavy-duty vehicle wheel end assembly of claim 1, wherein said seal includes a core being formed of a rigid material, and includes an elastomeric member being bonded to said core, said elastomeric member being formed of at least one of an elastomer and a polymer.

3. The outboard sealing system for a heavy-duty vehicle wheel end assembly of claim 2, wherein said core is generally L-shaped, including a radially-extending member and an axially-extending member, said axially extending member extending axially outwardly from a radially inward end of said radially-extending member.

4. The outboard sealing system for a heavy-duty vehicle wheel end assembly of claim 3, wherein said elastomeric member encapsulates said axially-extending member of said core.

5. The outboard sealing system for a heavy-duty vehicle wheel end assembly of claim 2, wherein said core is formed of steel.

6. The outboard sealing system for a heavy-duty vehicle wheel end assembly of claim 1, wherein a radially outward portion of said seal forms a radially outwardly-extending protrusion that seats radially against said hub bore surface.

7. The outboard sealing system for a heavy-duty vehicle wheel end assembly of claim 1, wherein a radially outward area of said seal seats axially against an axial stop feature.

8. The outboard sealing system for a heavy-duty vehicle wheel end assembly of claim 7, wherein said axial stop feature is a shoulder formed in said hub bore surface.

9. The outboard sealing system for a heavy-duty vehicle wheel end assembly of claim 8, wherein a groove is formed in said hub bore surface adjacent said shoulder, and a radially outward portion of said seal forms a radially outwardly-extending protrusion that seats radially in said groove.

10. The outboard sealing system for a heavy-duty vehicle wheel end assembly of claim 1, wherein said seal includes a fin extending radially inwardly to seat on said spindle nut.

11. The outboard sealing system for a heavy-duty vehicle wheel end assembly of claim 1, wherein said seal includes an outboardly-extending feature that seats against an axially inboard portion of said hubcap when the hubcap is installed on said hub.

12. The outboard sealing system for a heavy-duty vehicle wheel end assembly of claim 11, wherein said feature includes alternating radially convex shapes and radially concave shapes.

13. The outboard sealing system for a heavy-duty vehicle wheel end assembly of claim 11, wherein said seating of said feature against said hubcap resists rotation of said seal.

14. The outboard sealing system for a heavy-duty vehicle wheel end assembly of claim 1, wherein said seal is disposed radially outwardly of a keyway formed in said axle spindle, enabling air to flow along said keyway for pressure equalization.

15. The outboard sealing system for a heavy-duty vehicle wheel end assembly of claim 1, further comprising a corrosion barrier disposed between said hubcap and said hub outboard end.

16. The outboard sealing system for a heavy-duty vehicle wheel end assembly of claim 15, wherein said corrosion barrier includes at least one of a gasket, a coating applied to said hubcap, a coating applied to said hub outboard end, an adhesive, and a coating applied to the hubcap.

17. The outboard sealing system for a heavy-duty vehicle wheel end assembly of claim 16, wherein said corrosion barrier is formed of an elastomeric material or a polymeric material.

18. The outboard sealing system for a heavy-duty vehicle wheel end assembly of claim 16, wherein said corrosion barrier is formed of polyester film.

19. The outboard sealing system for a heavy-duty vehicle wheel end assembly of claim 16, wherein said coating includes anodizing of said hubcap.

20. The outboard sealing system for a heavy-duty vehicle wheel end assembly of claim 16, wherein said coating includes at least one of electro-coating and electro-deposition a compound on said hubcap.

21. The outboard sealing system for a heavy-duty vehicle wheel end assembly of claim 1, wherein said seal is in at least partial contact with said axle spindle nut.

* * * * *